US006805630B2

(12) United States Patent
Rubeli

(10) Patent No.: US 6,805,630 B2
(45) Date of Patent: Oct. 19, 2004

(54) SYSTEM AND APPARATUS FOR PLACING AND CONTROLLING A WAGER ON A GAMING DEVICE

(75) Inventor: Paul E. Rubeli, Paradise Valley, AZ (US)

(73) Assignee: Aztar Corporation, Phoenix, AZ (US)

( * ) Notice: Subject to any disclaimer, the term of this patent is extended or adjusted under 35 U.S.C. 154(b) by 0 days.

(21) Appl. No.: 10/145,111

(22) Filed: May 15, 2002

(65) Prior Publication Data

US 2002/0160831 A1 Oct. 31, 2002

Related U.S. Application Data

(62) Division of application No. 09/361,858, filed on Jul. 27, 1999, now Pat. No. 6,409,594.

(51) Int. Cl.[7] .................. A63F 13/00
(52) U.S. Cl. .................. 463/20; 273/274; 273/138.1
(58) Field of Search .................. 463/20, 25, 18, 463/11–13; 273/138.1, 274

(56) References Cited

U.S. PATENT DOCUMENTS 4,732,375 A 3/1988 Tetherton
4,948,134 A 8/1990 Suttle et al.
4,977,502 A 12/1990 Baker et al.
5,277,424 A 1/1994 Wilms
5,303,919 A 4/1994 Takemoto et al.
5,342,047 A 8/1994 Heidel et al.
5,570,885 A 11/1996 Ornstein
5,655,965 A 8/1997 Takemoto et al.
5,704,835 A 1/1998 Dietz, II
5,769,714 A 6/1998 Wiener et al.
5,803,809 A 9/1998 Yoseloff
5,813,511 A 9/1998 Takemoto et al.
5,823,874 A 10/1998 Adams
5,848,932 A 12/1998 Adams
5,868,619 A 2/1999 Wood et al.
5,882,261 A 3/1999 Adams
5,897,436 A * 4/1999 Singer et al. .............. 273/293
6,007,424 A 12/1999 Evers et al.
6,071,190 A 6/2000 Weiss et al.
6,287,195 B1 * 9/2001 Sugimoto .............. 463/20
6,368,213 B1 4/2002 McNabola

* cited by examiner

*Primary Examiner*—Vishu K Mendiratta
(74) *Attorney, Agent, or Firm*—Sughrue Mion, PLLC

(57) ABSTRACT

A system and method for placing and controlling a wager on a gaming device wherein the player initially establishes a credit limit by depositing coins into the gaming device. A player then controls the amount of his or her wager by using a single wager selection device, a multiple wager selection device or a combination of the two devices to determine the wager amount. The single wager selection device and the multiple wager selection device can be selected by a player repeatedly in order to arrive at the desired wager amount.

13 Claims, 5 Drawing Sheets

| Coins Bet | Prior Art (10 Coin Game) | Enhanced Payout Schedule |
|---|---|---|
| 1 | 400 | 400 |
| 2 | 800 | 800 |
| 3 | 1200 | 1200 |
| 4 | 1600 | 1600 |
| 5 | 2000 | 4000 |
| 6 | 2400 | 4400 |
| 7 | 2800 | 4800 |
| 8 | 3200 | 5200 |
| 9 | 3600 | 5600 |
| 10 | 8000 | 8000 |
| 20 | | 16000 |

*FIG. 5*

SYSTEM AND APPARATUS FOR PLACING AND CONTROLLING A WAGER ON A GAMING DEVICE

This is a divisional of Application No. 09/361,858 filed Jul. 27, 1999 now U.S. Pat. No. 6,409,595 dated Jun. 25, 2002; the disclosure of which is incorporated herein by reference.

BACKGROUND OF THE INVENTION

1. Field of the Invention

This invention relates generally to games of chance such as would be found in casinos and other legal gambling establishments. In particular, this invention relates to a system for placing varied wagers on a gaming device, wherein a single gaming device provides a wide array of wagering options for a player.

2. Background and Related Art

In those areas that accommodate legalized gambling, there is a constant demand and need for new and improved games of chance to attract players to casinos and other gambling establishments. At the same time, casinos and gambling establishments constantly research novel ways to accommodate the player.

One popular game that has long been enjoyed by players is the slot machine. Conventionally, the slot machine is configured for a player to input something of value (e.g., a standard denomination of currency or house token) to permit the player to activate the gaming device. Upon activation, a plurality of reels spin and ultimately stop to display a series of symbols. If a winning symbol or combination of symbols is displayed, the machine releases money into a payout chute or onto a credit meter.

Payout is defined as "any type of return upon winning a game of chance". Examples of a payout include, but are not limited to: coins, tokens, cash, credit on a card and any other type of compensation. Payout is determined by the amount wagered by the player at the beginning of the game and the odds of certain symbols or combination of symbols being displayed by the gaming machine.

Although there are numerous types of slot machines, conventionally a player must select a machine according to the amount that the player would like to wager. For example, if a player chooses a Five-Coin Slot Machine, the player wagers a single 'coin' at a time by selecting a "bet one" button or the player can bet a maximum of five 'coins' at one time by selecting a "max bet" button. If a player selects to wager the maximum bet at one time and is successful, the maximum bet payout includes an extra reward (ie: an increase in coins or payout received) in addition to the regular payout increment.

A Ten-Coin Slot Machine also exists in the prior art. This machine is identical to the Five-Coin Slot Machine, except that a player can wager a maximum bet of ten coins by selecting the "max bet" button or the player may place a wager in single increments, up to ten coins, by selecting the "bet one" button. If a player wishes to place a wager amount between one and nine coins while playing a Ten-Coin Slot Machine, the player must press the "bet one" button multiple times to reach the desired wager. However, a player may not place a wager higher than the amount associated with the "max bet" button. Furthermore, the "bet one" button and "max bet" button are mutually exclusive and can not be used in combination with each other.

Unfortunately, use of these prior art gambling systems incurs numerous problems for a player and the gambling establishment itself. Ten-Coin Slot Machines are not popular with players of the Five-Coin Slot Machines because the Ten-Coin Slot Machine requires the player to push the "bet one" button five times to achieve a five coin wager which slows down the game. More importantly, the Ten-Coin Slot Machine only pays the regular payout increment on a five coin wager without the five coin premium paid on the top award of the Five-Coin Slot Machines. Therefore, a player placing a five coin wager on a Ten-Coin Slot Machine is penalized for not betting ten coins. This problem is not limited to slot machines alone and is often found in other gaming devices such as: video poker machines, video roulette machines and video blackjack machines. It would therefore be desirable to provide a machine that allows video gambling players to determine the size of their wager, and in addition, does not penalize players according to the amount of their wager.

SUMMARY OF THE INVENTION

It is therefore an object of the present invention to give a player the ability to place their wager in increments greater than a unit monetary amount, but less than or equal to the maximum monetary amount.

Another object of the invention is to allow a player to take advantage of an enhanced payout on preselected multiple monetary amount(s) in addition to the maximum monetary amount capable of being wagered.

Yet another object of one embodiment of the invention is to give a player a range of wagering options which ultimately pays out a higher award.

Still another object of the invention is to maximize floor space in a casino or gambling establishment.

In accordance with these novel aspects of the present invention and others aspects which will become apparent below, the wager control system of the present invention is based on a processor and a plurality of wager selection devices. The wager selection device enables a player to determine the value of a wager by selecting to increment a wager by a single amount or a multiple amount. This system for placing a wager can be used with conventional games of chance. Examples include, but are not limited to: blackjack, slot roulette, poker, any game involving dice or cards or any wagering occasion in general, whether in conventional or video format. This system is not limited to video gambling machines. The system can also be incorporated within a conventional gaming table.

In an exemplary embodiment of the present invention, the system is incorporated into a slot machine gaming device for use by a single player. The system includes a processor for arithmetically calculating a wager and the possible payout, a single wager selection device, and a multiple wager selection device, wherein the wager selection devices are accessible to the player and communicate with the processor.

The single wager selection device is used by the player to electrically indicate to the processor that a single coin wager has been placed. The multiple wager selection device allows a player to place multiple wagers of a maximum monetary amount (i.e., ten tokens). Furthermore, the multiple wager selection device can be used in conjunction with the single wager device. Therefore, a player could place a wager of twenty tokens by selecting the multiple wager selection device twice or by selecting the single wager device twenty times. Similarly, a player could place a wager of twelve tokens by selecting the multiple wager selection device once and the single wager selection device twice, or by selecting the single wager device twelve times.

In another embodiment of the invention, the system includes a processor for arithmetically calculating a wager and a payout, a single wager selection device, a multiple wager selection device and a max wager selection device, wherein the three wager selection devices communicate with the processor. The single wager selection device is used by the player to electrically indicate to the processor that a single token wager has been placed. The multiple wager selection device allows a player to increase their wager in increments of a predetermined monetary amount at a single time (i.e., five tokens) and the maximum wager selection device allows a player to wager the maximum monetary amount possible.

In yet another exemplary embodiment of the present invention, the bet selection devices are incorporated in a touch screen liquid crystal display (LCD). The touch screen LCD's can be hand held or mounted on an object.

According to another exemplary embodiment of the present invention, the system for placing a wager is incorporated into a gaming table.

Still another embodiment of the present invention involves an apparatus comprising: a housing unit, a game of chance, a game display, an activation device such as a handle, a currency slot and a plurality of wager selection devices for enabling a player to place varied wagers.

BRIEF DESCRIPTION OF THE DRAWING FIGURES

The invention will be better understood from the detailed description below, in consideration of the non-limiting, explanatory drawing figures which are now briefly described.

FIG. 5 is a graphical representation of the enhanced payout schedule.

DETAILED DESCRIPTION OF THE PREFERRED EMBODIMENTS

Figure 1:
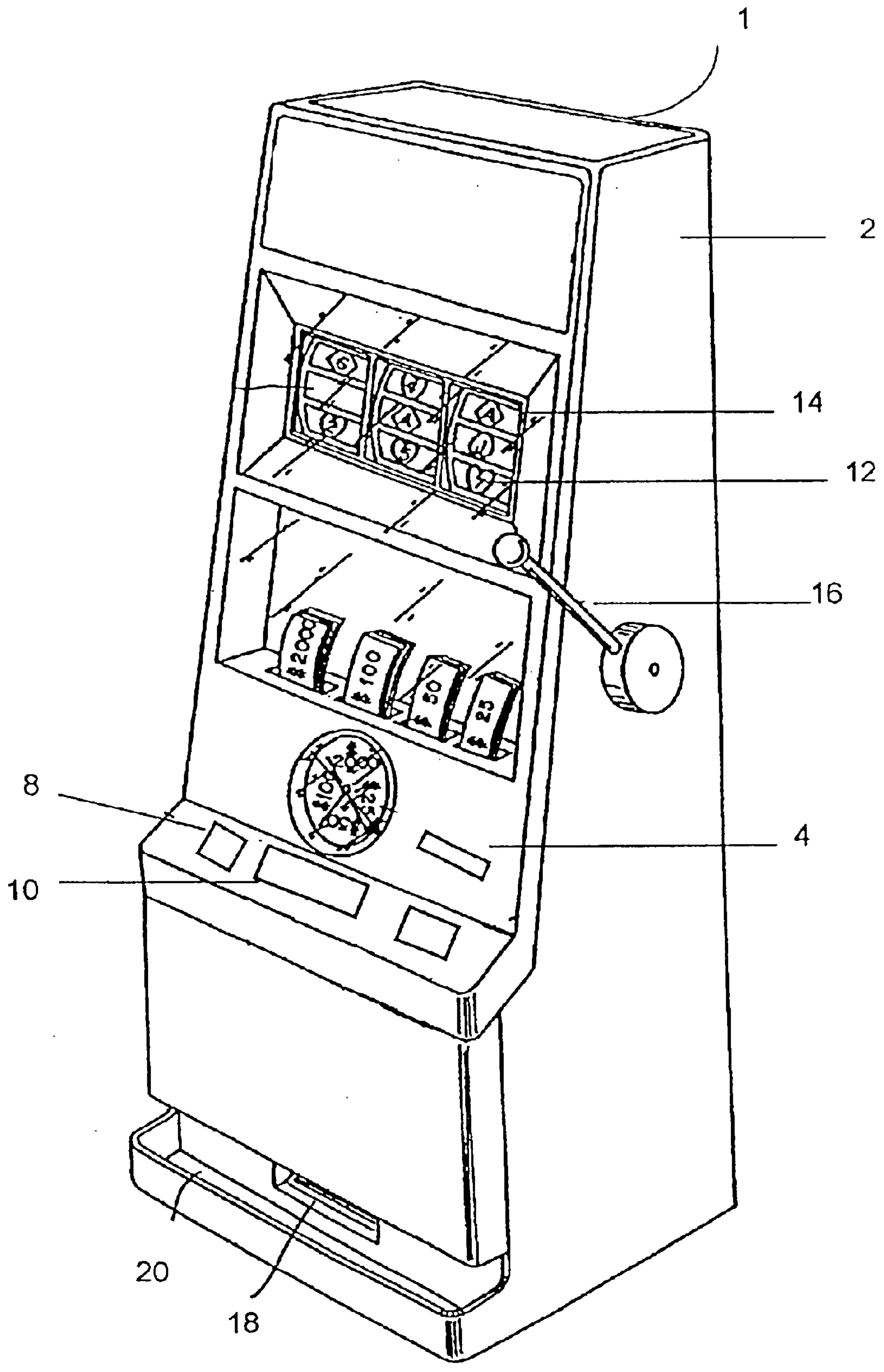
FIG. 1 is a plan view of an exemplary embodiment of the system of the present invention, wherein the game of chance is a slot machine.

As used herein, the term "computer system" is to be understood to include at least a memory and a processor. In general, the memory will store, at one time or another, at least portions of an executable program code, and the processor will execute one or more of the instructions included in that executable program code. It will be appreciated that the term "executable program code" and the term "software" mean substantially the same thing for the purposes of this description. It is not necessary to the practice of this invention that the memory and the processor be physically located in the same place. That is to say, it is foreseen that the processor and the memory might be in different physical pieces of equipment.

On a practical level, the software that enables the computer system to perform the operations described further below in detail, may be supplied on any one of a variety of media. Furthermore, the actual implementation of the approach and operations of the invention are actually statements written in a programming language. Such programming language statements, when executed by a computer, cause the computer to act in accordance with the particular content of the statements. Furthermore, the software that enables a computer system to act in accordance with the invention may be provided in any number of forms including, but not limited to, original source code, assembly code, object code, machine language, compressed or encrypted versions of the foregoing, and any and all equivalents.

One of skill in the art will appreciate that "media," or "computer-readable media," as used here, may include a diskette, a tape, a compact disc, an integrated circuit, a ROM, a cartridge, a remote transmission via a communications circuit, or any other similar medium useable by computers. For example, to supply software for enabling a computer system to operate in accordance with the invention, the supplier might provide a diskette or might transmit the software in some form via satellite transmission, via a direct telephone link, or via the Internet. Thus, the term, "computer readable medium" is intended to include all of the foregoing and any other medium by which software may be provided to a computer.

Although the enabling software might be "written on" a diskette, "stored in" an integrated circuit, or "carried over" a communications circuit, it will be appreciated that, for the purposes of this application, the computer usable medium will be referred to as "bearing" the software. Thus, the term "bearing" is intended to encompass the above and all equivalent ways in which software is associated with a computer usable medium.

For the sake of simplicity, therefore, the term "program product" is thus used to refer to a computer useable medium, as defined above, which bears any form of software to enable a computer system to operate according to the below-identified invention.

A detailed description of the preferred embodiments of the invention will now be given referring to the accompanying drawings.

The various embodiments of the present invention are designed to enable wagers of various amounts to be placed by a person while playing a game of chance on a gaming device. As described above, the prior art lacks a single device or apparatus that allows a player to select a wager of a predetermined multiple monetary amount greater than a unit monetary amount but less than or equal to the maximum monetary amount capable of being wagered. The present invention solves such a problem by allowing a player to increment their wager by a single amount or predetermined multiple amount, or by combining the single amount and multiple amount to arrive at a specific wager.

A number of aspects of the invention are summarized below, along with different embodiments that may be included in each of the summarized aspects. It should be understood that the embodiments are not necessarily inclusive or exclusive of each other and, may be combined in any manner that is non-conflicting and otherwise possible. It should be understood that these aspects of the invention are exemplary only and are considered to be non-limiting.

In the description below, a player is a person who plays a game of chance. This player will also be referred to as a person or a gambler.

Referring to FIG. 1 of the drawings, FIG. 1 is an exemplary embodiment of the gaming device upon which the wagering system of the present invention may be employed.

The gaming device 1, otherwise known as a slot machine, is just one example of a gaming device upon which the system of the present invention could operate. The present invention however, is not limited to this embodiment.

The wager control system of the present invention can be utilized by a number of other gaming devices. Examples of other gaming devices are video poker games, video roulette games and video blackjack games. In addition, gaming tables of blackjack and roulette are included. Betting windows, often used when wagering on a sport such as horse racing, would also benefit from application of the invention.

The gaming device 1 comprises a housing unit 2 and a currency slot 4, which is located on the exterior face of the housing unit. To activate the gaming device 1, a player must input something of representative value, usually a standard denomination of currency, a debit/credit card or a house token (hereinafter referred to as a 'coin'), into the currency slot 4 or any other type of a value entry device, wherein a credit limit is then established for the player. The currency slot 4 includes devices that establish credit limits using personal credit cards or credit cards issued by the gaming establishment. When at least one coin has been inputted into currency slot 4, the gaming device 1 is activated and a player must place a wager.

According the Webster's New Third International Dictionary, a wager is "something (usually money) that is risked on an uncertain event." A wager is also known as a bet, stake or pot and may be referred to such hereinafter.

A wager of a specific value is placed when the player selects either the single wager selection device 8 or the multiple wager selection device 10. Both the single wager selection device 8 and the multiple wager selection device 10 can be in the form of a button, a dial, a roller ball, a touch screen, a switch, or any other device that allows a user to interact with a machine. The single and multiple wager selection devices 8/10 can also be used in combination with each other to arrive at an exact wagering amount.

In an exemplary embodiment of FIG. 1, the single wager selection device 8 is associated with a single coin amount. Therefore, if a player selects the single wager selection device 8 one time, the player places a single coin wager. Additionally, if a player selects the single wager selection device 8 three times, the player places a three coin wager. The single wager selection device is associated with a single monetary amount. The amount associated with the single wager selection device can be any monetary amount (e.g.; $0.25, $1.00, $2.00).

The multiple wager selection device 10 is associated with a predetermined maximum coin amount (e.g., five coins). Therefore, if a player selects the multiple wager selection device 10 one time, the player places a five coin wager. Additionally, if a player selects the multiple wager selection device 10 three times, the player places a fifteen coin wager. Therefore, the multiple wager selection device 10 can be selected multiple times, wherein the wager is incremented by the amount associated with the multiple wager selection device 10. The multiple amount associated with the multiple wager selection device 10 can be of any value amount, therefore the five coin example should not be construed as a limitation. The multiple amount associated with the multiple wager selection device is a multiple of the amount associated with the single wager selection device.

Additionally, the single wager selection device 8 and the multiple wager selection device 10 can be used together to place an exact wager. For example, if a player desires to wager thirteen coins on a particular game of chance employing the system of the present invention, the player simply would select the multiple wager selection device 10 twice, upon which a wager of ten coins is placed, followed by the selection of the single wager selection device three times, thereby arriving at the desired wager of thirteen coins. The ability to place an exact wager gives a player the opportunity to play any machine without giving deference to the wager amount required by a specific machine as was conventional in the prior art.

The gaming device 1 also comprises rotatable game reels 12, each of which embody a plurality of indicia (i.e., heart, diamonds, clubs, spades in combination with numbers) displayed to the player through game display 14. The indicia embodied on the rotatable game reels 12 usually represent the specific game of chance being played by the player. As is known in the art, other indicia of games of chance, such as numbers, symbols or individually dealt playing cards, can be substituted for the rotatable game reels 12 of the exemplary embodiment and displayed as video on the game display 14. Therefore, the rotatable game reels are just one aspect of one exemplary embodiment and should not be construed as a limitation.

The gaming device 1 further comprises a spin handle 16, which when pulled in a downward motion, spins the rotatable game reels 12. Nevertheless, the rotatable game reels can be rotatably activated in a number of ways including: the depression of a button, the clicking of a mouse, by audio means or any other means of inducing activity. Therefore, the spin handle is just one aspect of one exemplary embodiment and should not be construed as a limitation.

Once activated by the spin handle 16, the rotatable game reels 12 rotate and eventually stop in an order displaying the indicia on a game display 14. If the collection of indicia displayed by the reels is one of a predetermined combination, the player is provided with a winning payout, which is directly related to the amount wagered at the beginning. The winning payout is delivered through the payout chute 18 that deposits the payout into tray 20 or onto a credit meter.

Figure 2:
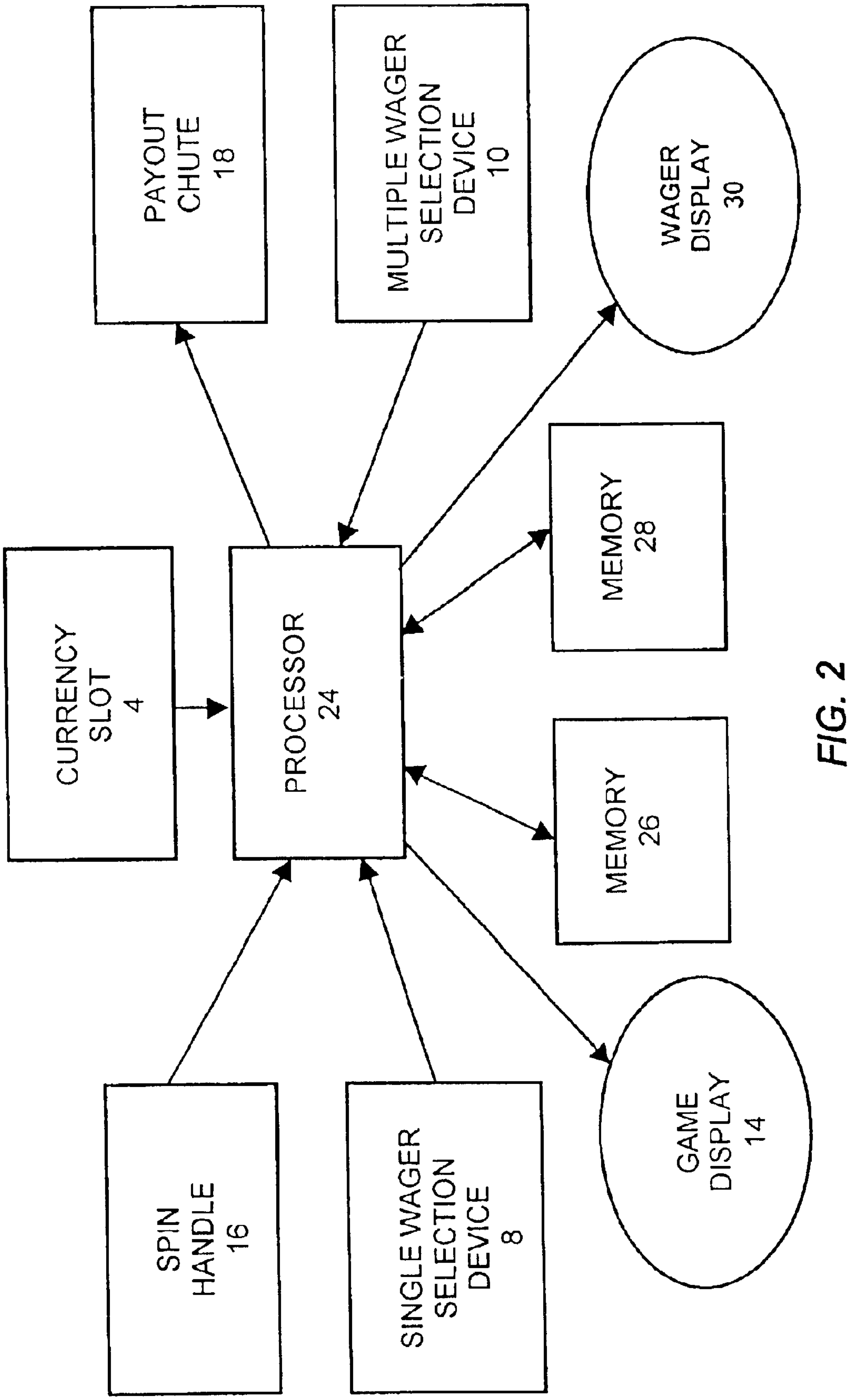
FIG. 2 is a block diagram of the computer hardware and associated signals for implementing the system for controlling and placing a wager on a gaming device.

FIG. 2 is a block diagram of the computer system and related hardware components utilized in the present invention. As coins are deposited into currency slot 4, the processor 24 calculates the value of the coins and thus establishes a credit limit for the player. Processor 24 stores this credit limit in a memory 26. As described above, the credit limit may be input using a personal credit card or a credit card issued by the gaming establishment.

After a credit limit has been established and is stored in memory 26, a player places a wager by selecting at least one of the single wager selection device 8 or the multiple wager selection device 10. The single wager selection device 8 and multiple wager selection device 10 communicate with the processor 24 via signals. Upon receiving a signal from the single wager selection device 8 or the multiple wager selection device 10, the processor 24 calculates the wager amount and stores the wager amount in memory 28. In one embodiment, the wager amount is then displayed to the player on the wager display 30.

Figure 3:
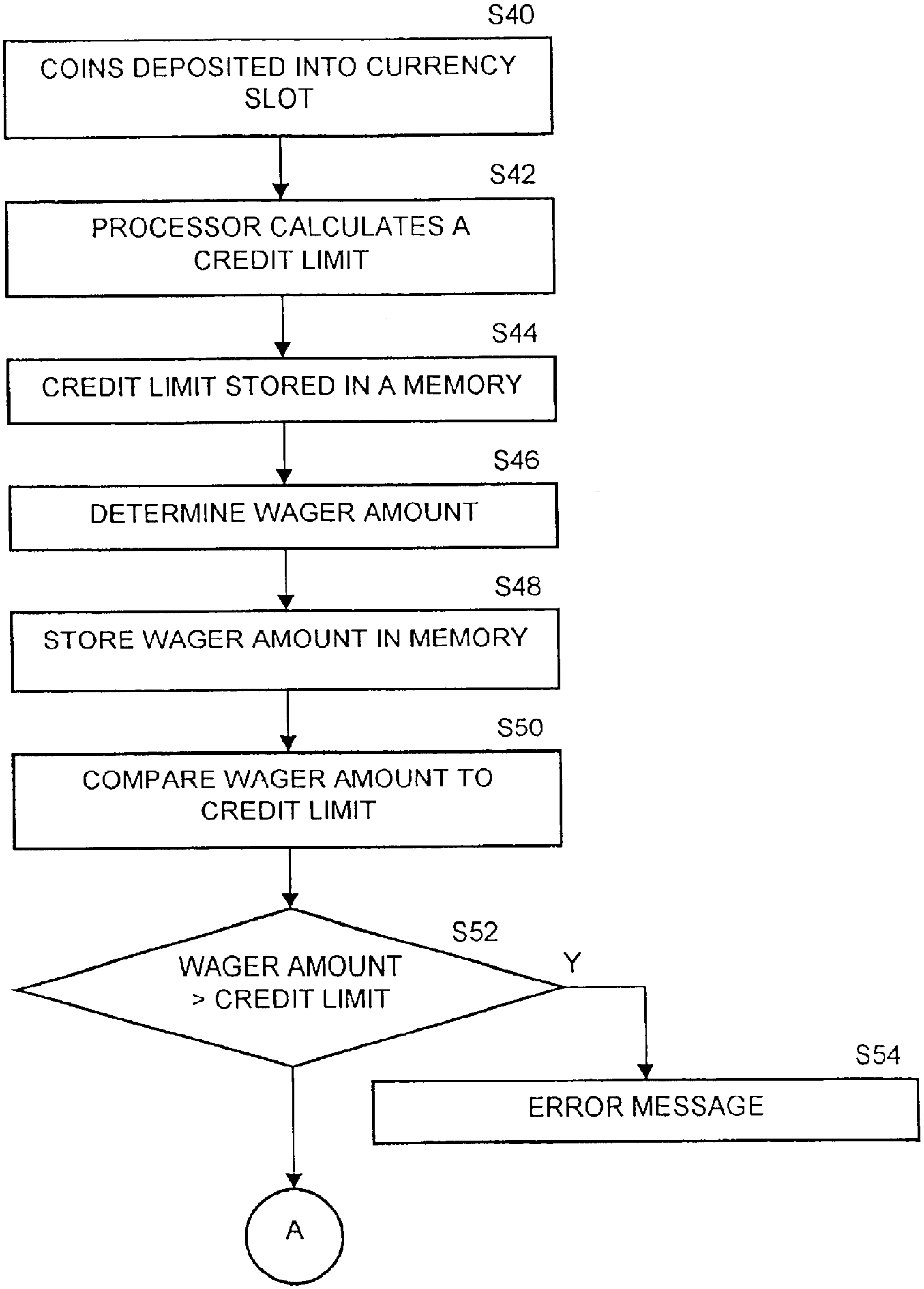
FIG. 3 is a flow chart depicting the operation of a wager control system according to an embodiment of the invention.
Figure 4:
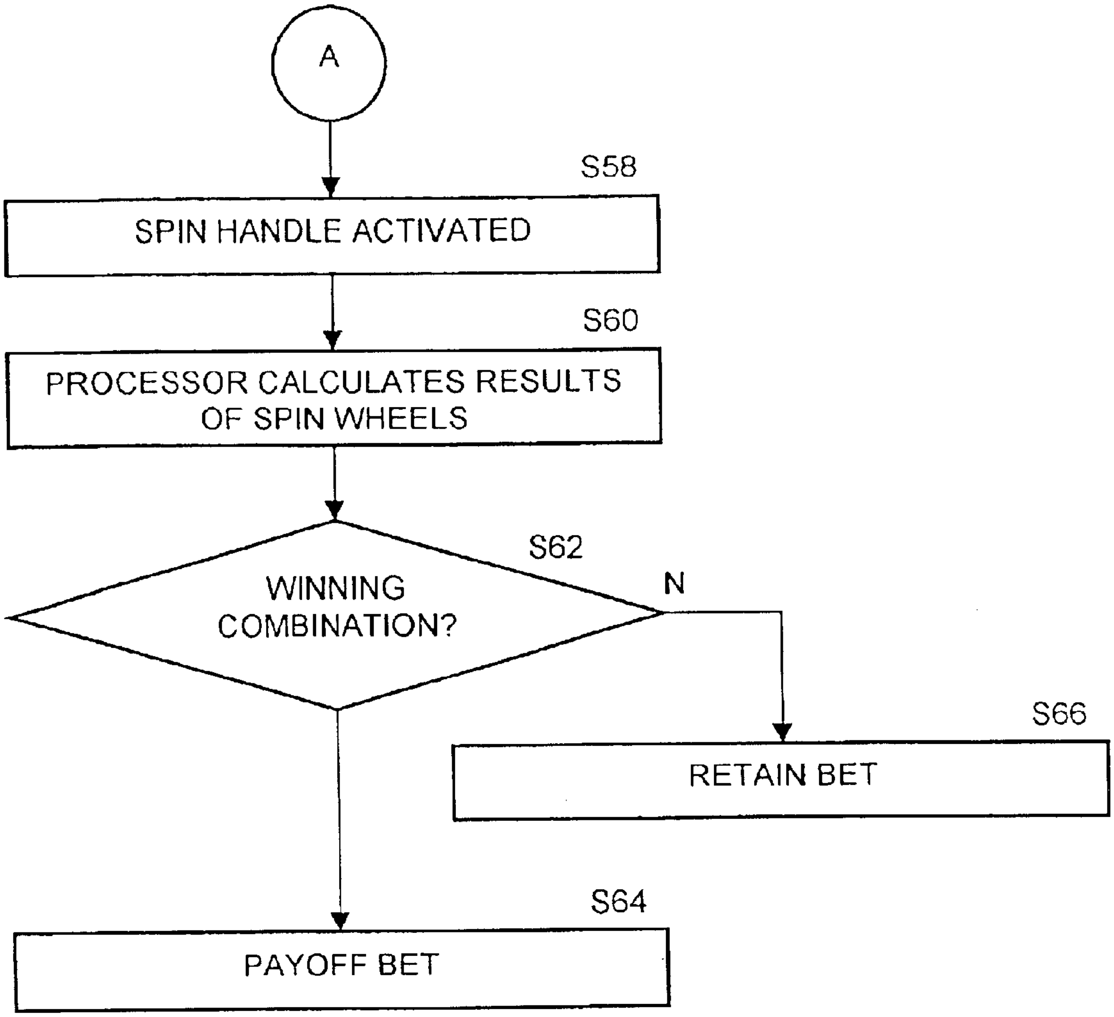
FIG. 4 is a continuation of the flow chart depicting the operation of an wager control system according to an embodiment of the invention.

FIGS. 3 and 4 are flow charts depicting how a wager is determined on a gaming device and the subsequent steps thereafter.

As described in Step S40, the currency slot accepts coins from a player, whereby the processor calculates the value of the coins at Step S42 and stores this value (or credit limit) in a memory at Step S44.

The single and multiple wager selection devices are then used by the player to place a wager as described in Step S46.

Once the processor has calculated the values associated with each wager selection device, the calculated wager amount is stored in a memory at Step S48.

According to Step S50, the processor compares the wager amount stored in a memory with the credit limit stored in a memory. If the wager amount is greater than the credit limit at Step S52, an error message will be displayed at Step S54 requiring the player to re-select a wager of a lower value or to increase the credit limit by inputting more coins into the currency slot.

Referring back to Step S52, when the wager amount is less than or equal to the credit limit, the player may activate the spin handle by pulling the handle in a downward motion at Step S58, thus sending the appropriate signal to the processor. The processor reacts to the signal by spinning the rotatable spin reels. Once the rotatable spin reels ultimately stop and a combination of indicia are displayed, the processor calculates the predetermined combination odds and the wager amount placed by the player to determine if there was a win at Step S60. If the processor determines a 'win' at Step S62, the processor sends a signal to the payout chute and the appropriate winning payout is dispensed at Step S64 or credited to a meter.

FIG. 5 describes one aspect of one embodiment of the present invention. As described earlier, the prior art does not accommodate players who wagered amounts lower than the maximum bet requirement of a particular machine. For example, if a player wagers five coins on a ten coin machine, the player is penalized for not playing ten coins because the premium paid on the 'top award' (an increase in the winnings payout) for a five coin wager is not realized on the ten coin machine.

The exemplary embodiment described in FIG. 5 solves the above stated problem. FIG. 5 depicts an enhanced payout schedule as one aspect of one embodiment of the wager placing system of the present invention.

As described in FIG. 2, a wager is placed by selecting either the single increment device, wherein the wager value is increased by one coin, or the multiple increment device, wherein the wager value is increased by the multiple of a predetermined value (e.g., five coins). In addition, a gaming device usually has a preset maximum value wager (e.g.: ten coins) wherein, if the maximum is wagered, the returns for a win are greater.

The enhanced payout schedule incorporates the premium top award realized on a winning multiple increment wager (e.g., five coin wager) or the maximum wager (e.g., ten coins) into the payouts between the five coin multiple wager and the preset maximum wager of ten coins. Therefore, payouts on a six, seven, eight or nine coin wagers also include the top award premium. FIG. 5 shows the premium paid on the top award of a multiple increment wager.

By incorporating the enhanced payout schedule into the wager placing system of the present invention, a gaming device player has the ability to take advantage of an enhanced payout on a selected multiple monetary amount(s) in addition to the maximum monetary amount capable of being wagered. For example, the enhanced payout schedule does not penalize a player for placing a wager that is less than the maximum amount for a particular gaming machine.

Another embodiment of the present invention is a computer system adapted to calculate and accept wagers of varying amounts. The computer system is implemented as part of a game of chance, such as a slot machine or other gaming devices as described above. The computer system includes a processor and a memory including software instructions adapted to enable the computer system to perform the steps of the invention. As described above, the steps of the invention include storing in the memory a representative value, wherein the representative value represents a maximum credit limit for a player. After the player's credit limit is established, the computer system determines a wager amount. The player uses the single and the multiple wager selection devices to place a wager, wherein the signals from the single wager selection device and the multiple wager selection device are combined when more than one signal is received, and the computer system calculates the wager amount. The single and multiple wager selection devices can be buttons or may be elements of a touch screen. After the wager amount is determined, the computer system stores the wager amount in the memory.

The computer system compares the wagered amount to the credit limit, wherein the wager amount must be equal to or less than the credit limit. If not, the player is not allowed to proceed unless additional money or tokens or some other representative value is input or the player's wager is lowered.

In yet another embodiment of the present invention, the system for placing and controlling a wager may be implemented within a gaming device via a computer program product, containing programmable code, such a disk or CD.

The computer program product embodying the present invention includes software instructions for enabling the computer to perform predetermined operations, and a computer readable medium bearing the software instructions. The predetermined operations include the step of calculating a credit limit value. The credit limit value is obtained by adding the values of an input into a currency device. This input, as described above, can be a coin amount, a personal credit card, a gaming establishment credit card, or tokens. The software instructions store the credit limit in a first memory. The software instructions then intercepts a first signal from a single wager selection device, wherein the first signal is associated with a single monetary amount. The software instructions intercept a second signal from a multiple wager selection device, wherein the second signal being associated with a multiple monetary amount.

The software instructions calculate a wager amount according to the first signal and the second signal, and then stores the wager amount in a second memory. The software instructions compare the wager amount to the credit limit, wherein the wager amount must be equal to or less than the credit limit. If not, the player is not allowed to proceed unless additional money or tokens or some other representative value is input or the player's wager is lowered.

As noted above, the present invention provides numerous advantages. Various embodiments of the present invention provide certain advantages to overcome certain drawbacks of the conventional technique while other embodiments provide the same or different advantages, and overcome the same or other drawbacks in the same or different manner. Thus, although there have been described particular embodiments of the present invention of a system for varying a wager, it is not intended that such references be construed as limitations upon the scope of this invention except as set forth in the following claims.

I claim:

1. A gaming apparatus offering wager control capabilities, comprising:

a housing unit for housing a game of chance, an activation component for playing the game of chance, a single wager selection device for placing a wager of a single monetary amount, wherein the single wager selection device can be selected multiple times to increment a wager each time by a single monetary amount;

a multiple wager selection device for placing a wager of a multiple monetary amount, said multiple wager selection device configured to be selected multiple times to increment a wager each time by a multiple monetary amount, said multiple wager selection device also configured to be used in combination with said single wager selection device to determine said wager amount; and a display medium for indicating the amount of the wager.

2. The gaming apparatus of claim 1, wherein the display medium can be either one of a visual component or an audio component.

3. The gaming apparatus of claim 1, wherein the single wager selection device and the multiple wager selection device are buttons.

4. The gaming apparatus of claim 1, wherein the single wager selection device and the multiple wager selection device are touch screen displays.

5. The gaming apparatus of claim 1, wherein an enhanced payout schedule is activated when the single wager selection device and the multiple wager selection device are used in combination to place a wager.

6. A gaming apparatus offering wager control capabilities comprising:

a housing unit for housing a game of chance, wherein said game of chance has a houseset predetermined maximum betting amount, an activation component for having the game of chance, a value entry device for inputting a representative value into said housing unit, wherein depositing the representative value creates a maximum credit limit for a player;

a multiple wager selection device for determining a wager amount, said multiple wager selection device configured to allow the player to control the wager amount by selecting said multiple wager selection device, multiple times to increment in wager amount above the game of chance's houseset maximum betting amount, wherein an enhanced payout schedule is associated with a player's wager that is incremented above houseset predetermined maximum betting amount associated with the multiple wager selection device.

7. The gaming apparatus according to claim 6, wherein the multiple wager selection device is associated with a enhanced payout schedule.

8. The gaming apparatus according to claim 6, wherein the player can use a combination of any one of a plurality of wager selection devices to place a wager of an exact amount.

9. A gaming apparatus offering wager control capabilities comprising:

a housing unit for housing a game of chance, wherein said game of chance has a houseset predetermined maximum betting amount, an activation component for playing the game of chance, a value entry device for inputting a representative value into said housing unit, wherein depositing the representative value creates a maximum credit limit for a player;

a single wager selection device for placing a wager of a single monetary amount, wherein the single wager selection device can be selected multiple times to increment a wager each time by a single monetary amount;

a multiple wager selection device for determining a wager amount, said multiple wager selection device configured to allow the player to control the wager amount by selecting said multiple wager selection device, which corresponds to a maximum betting amount, multiple times to increment in each time by a multiple monetary amount, to a wager amount above the game of chance's houseset predetermined maximum betting amount, wherein an enhanced payout schedule is activated when the single wager selection device and the multiple wager selection device are used in combination to place a wager.

10. The gaming apparatus according to claim 9, wherein the player can use a combination of any one of a plurality of wager selection devices to place a wager of an exact amount.

11. The gaming apparatus of claim 9, further comprising a visual display medium or an audio display medium.

12. The gaming apparatus of claim 9, wherein the single wager selection device and the multiple wager selection device are buttons.

13. The gaming apparatus of claim 9, wherein the single wager selection device and the multiple wager selection device are touch screen displays.

* * * * *